UNITED STATES PATENT OFFICE.

WM. HALSTED, OF WASHINGTON, DISTRICT OF COLUMBIA, AND OLIVER S. HALSTED, JR., OF NEWARK, NEW JERSEY.

IMPROVEMENT IN ARTIFICIAL FUEL.

Specification forming part of Letters Patent No. 43,112, dated June 14, 1864.

*To all whom it may concern:*

Be it known that we, WILLIAM HALSTED, of the city of Washington and District of Columbia, and OLIVER S. HALSTED, Jr., of the city of Newark, State of New Jersey, have discovered a new and useful Improvement in the Mode and Manner of Making Artificial Fuel of Certain Ingredients—viz., refuse anthracite coal, refuse coke from distilled coal, refuse wood chippings or cuttings, or sawdust or tan, coal-tar, or tar produced by distillation of coal, and water, mixed or used together in different manner and quantities and combinations; and we hereby declare the following to be a full and exact description thereof.

The nature of our invention is the combining some or all of the ingredients above mentioned together in certain proportions, hereinafter specified, and then moistening or wetting them with water, then evaporating the water by heat and pressure, and thus causing the ingredients thoroughly to combine together and solidify.

To enable others skilled in the art to make and use the same, we will proceed to describe the mode of making and using our invention.

First, one kind thus: First, take refuse anthracite coal, one hundred parts; second, take water enough to moisten and wet the coal; third, take from eight to twelve parts of coal-tar. The above ingredients to be mixed together, then submitted to heat and pressure sufficient to evaporate the water and cause the ingredients thoroughly to combine and solidify. This may be done by pressing them in molds or forms which have been or are exposed to the fire or necessary heat.

Second kind: First, take refuse coke from distilled coal, one hundred parts; second, water sufficient to wet and moisten the coke; third, take from three to six parts of coal-tar. The above ingredients to be mixed together, made into suitable forms and bulk, then subjected to sufficient heat and pressure to evaporate the water and cause the ingredients thoroughly to combine and solidify.

Third kind: First, take of sawdust, tan, or wood cuttings or chippings, one hundred parts; second, water to wet and moisten them; third, take from one to three parts coal-tar. Mix these ingredients together, mold into forms, subject them to sufficient heat and pressure to evaporate the water and to cause the ingredients thoroughly to combine and solidify.

Fourth kind: First, take one hundred parts of refuse anthracite coal; second, take from twenty-five to thirty-five parts of refuse coke from distilled coal; third, take of water sufficient to wet and moisten the above ingredients; fourth, take from five to eight parts coal-tar. Mix together and mold into forms, then evaporate the water under heat and pressure, as above described.

Fifth kind: First, take from seventy-five to one hundred parts of refuse anthracite coal; second, take from thirty to fifty parts of sawdust, tan, or wood cuttings or chippings; third, take from twenty-five to thirty parts of coke; fourth, take of water sufficient to wet or moisten these ingredients; fifth, take from five to seven parts of coal-tar. Mix together, mold, and combine under heat and pressure to evaporate the water and solidify, as above described.

We do not claim as our invention the use of any one or two of the ingredients above mentioned; but

What we claim is—

The combination and mixture of the ingredients in the manner and in the proportions above described.

Washington, May 20, 1864.

WM. HALSTED.
O. S. HALSTED, JR.

Witnesses:
GEO. W. GREGORY,
WM. C. DOABE.